Nov. 10, 1964    R. BOYER, SR    3,156,323
BRAKE ADJUSTING MECHANISM
Filed Feb. 14, 1963
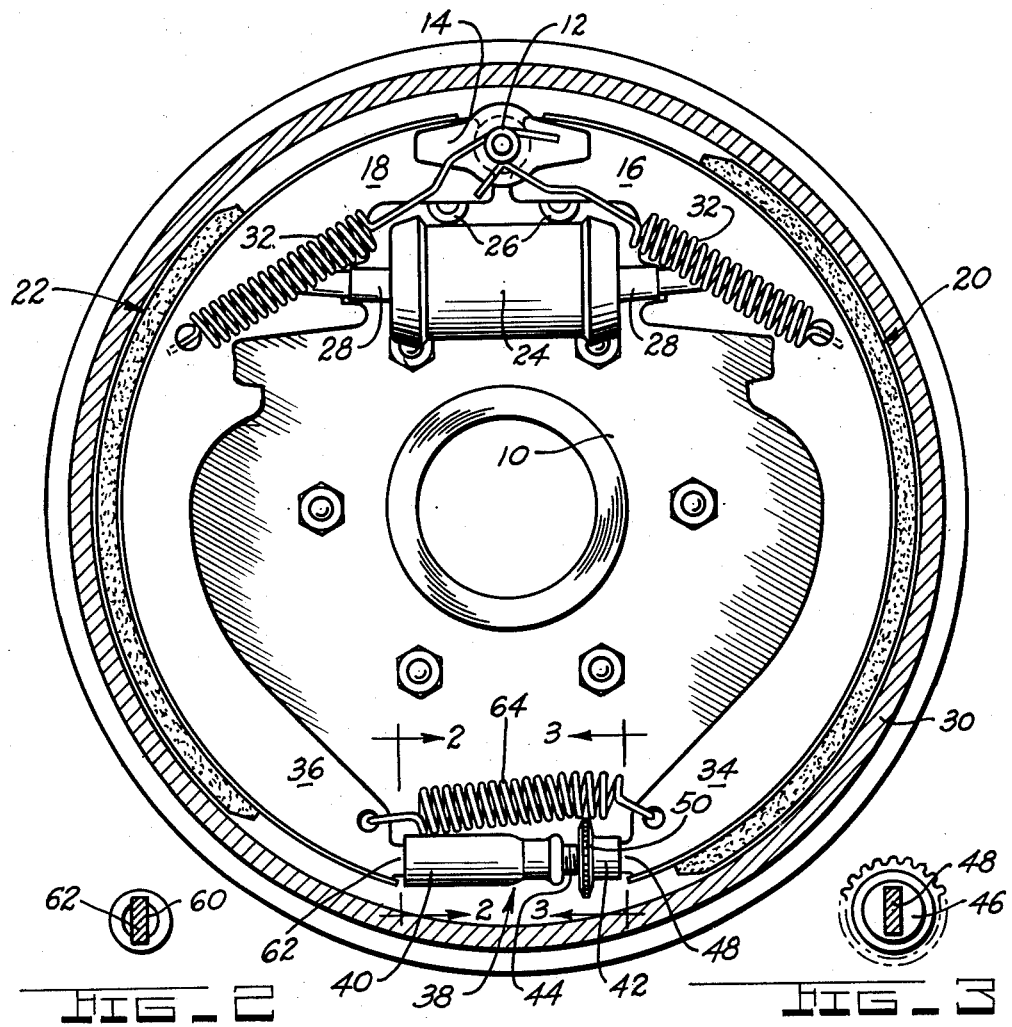
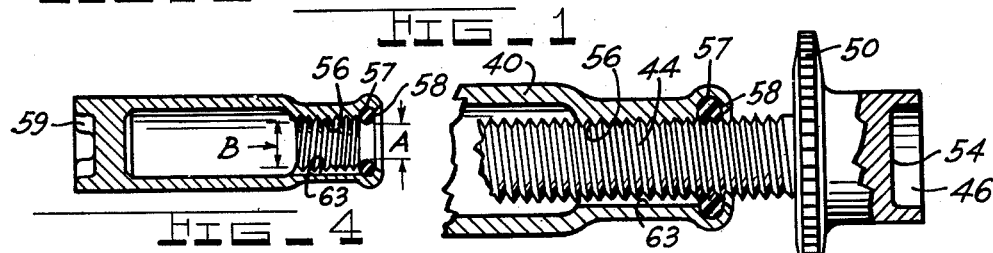
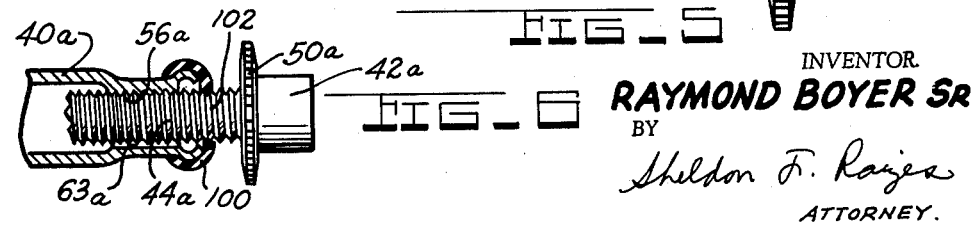
INVENTOR.
RAYMOND BOYER SR.
BY
*Sheldon F. Raizes*
ATTORNEY.

United States Patent Office 3,156,323
Patented Nov. 10, 1964

3,156,323
BRAKE ADJUSTING MECHANISM
Raymond Boyer, Sr., South Bend, Ind., assignor to The Bendix Corporation, South Bend, Ind., a corporation of Delaware
Filed Feb. 14, 1963, Ser. No. 258,523
7 Claims. (Cl. 188—79.5)

This invention relates to a brake adjusting mechanism comprising two relatively rotatable members.

A brake adjusting mechanism commonly employed on brakes of today's vehicle comprises a hollow internally threaded adjusting screw nut and an adjusting screw having a threaded portion thereon received within said adjusting screw nut. Upon relative rotation between the adjusting screw and the adjusting screw nut, the adjusting mechanism is extended to automatically adjust for wear of the brake shoe lining.

It is an object of this invention to seal the interior of the adjusting screw nut from outside contaminants.

Another object of the invention is to provide the adjusting mechanism with a member which provides for at least a predetermined amount of frictional resistance to relative rotation between the adjusting screw and the adjusting screw nut.

The above and other objects and features of the invention will appear more fully hereinafter from the consideration of the following description, taken in connection with the accompanying drawings wherein an embodiment of the invention is illustrated by way of example. In the drawings:

FIGURE 1 is a plan view of a brake assembly;
FIGURE 2 is a view taken on section line 2—2 of FIGURE 1;
FIGURE 3 is a view taken on section line 3—3 of FIGURE 1;
FIGURE 4 is a blown-up view in section of the adjusting screw nut;
FIGURE 5 is a blown-up view in section of a portion of the brake adjusting mechanism assembled; and
FIGURE 6 illustrates a modification of the embodiment of FIGURE 1.

With reference to FIGURE 1, the brake with which the device of the invention is associated, comprises a backing plate 10 mounted on an appropriate part of a vehicle such, for example, as the axial flange, not shown. Positioned on the backing plate is a fixed anchor pin 12 provided with a guide member 14 extending parallel to the backing plate for sliding engagement with ends 16 and 18 of shoes 20 and 22 so as to retain the adjacent shoe ends in a laterally fixed location with respect to backing plate 10. The shoe ends 16 and 18 are spread apart by a fluid motor 24 secured to the backing plate 10 by any suitable means, such as fastening members 26. The fluid motor includes a pair of oppositely acting pistons, not shown, operatively connected to the shoe ends 16 and 18 through force transmitting links 28. Actuation of the pistons applies a force to each of the links tending to move the shoes toward a rotatable drum 30 which may be secured to a wheel, not shown. Springs 32 have one end connected to the anchor 12 and the other end connected to the respective shoes to urge them into contact with the anchor when the fluid motor is not pressurized.

The shoe ends 34, 36 oppositely disposed from the anchor 12 are interconnected by an adjusting mechanism 38. The adjusting mechanism comprises an adjusting screw 42 and an adjusting screw nut 40 which are relatively rotatable. The adjusting screw 42 is provided with a threaded stem 44 and a round opening 46 into which a projection 48 of shoe end 34 extends.

The end of the projection 48 bears on the closed end 54 of the opening 46. This provides a bearing surface on which the adjusting screw 42 is rotated. The adjusting screw nut 40 is provided with a threaded tubular portion 56 which terminates at an annular recess 57. An O-ring 58 is received within the recess 57 and has an inner diameter A, before compression, which is smaller than the root diameter B of the threads. The O-ring 58 may be of any desired shape in cross section and of any suitable deformable material having the desired sealing, frictional and resilient qualities such as rubber, Teflon, or nylon. End 59 of the adjusting screw nut 40 is formed with a rectangularly shaped slot 60 to receive projection 62 of shoe end 36 of similar shape but dimensionally smaller so as to fit into said opening. The adjusting screw 42 is threadedly received within the adjusting screw nut and compresses the O-ring 58 against the surface of the annular recess 57 to provide a seal protecting the interior of the adjusting screw nut 40 from outside contaminants. A spring 64 acts to maintain projection end 52 bearing on surface 54 and projection 62 within its associated slot 60.

The adjusting screw 42 is further equipped with a serrated portion 50 for rotating said screw when an adjustment is required. The serrations are either engaged by a tool which is inserted through an opening in the backing plate for manual adjustment, or are engaged by a lever of a well-known automatic adjuster such as illustrated in the patent to Dombeck et al., U.S. Patent No. 2,938,610. Since the adjusting screw 42 compresses the O-ring 58, rotation of the adjusting screw must be effected against frictional resistance between the O-ring and the adjusting screw thereby providing for at least a predetermined amount of frictional resistance to rotation of the adjusting screw.

If desired, a longitudinal groove 63 may be provided in the threaded portion 56 of the adjusting screw nut 40 to provide a passageway for permitting freer flow of grease to the threaded connection between the adjusting screw and the adjusting screw nut than without the groove. The groove width may be on the order of about .010 inch and would preferably be located at the longitudinal bottom portion of the adjusting screw nut.

The O-ring actually serves three purposes: (1) the inside of the adjusting screw nut is free from contaminants which hinder free rotation of the adjusting screw; (2) it is now possible to place lifelong supply of lubricant in the adjusting screw nut which will assure that the threaded portion of the adjusting screw, which is disposed therein, will always be lubricated to provide for lubricated rotation between the adjusting screw and the adjusting screw nut at all times without the danger of the lubricant squirting out of the adjusting screw nut and becoming attached to the brake linings; and (3) the seal also provides for at least a predetermined amount of resistance to rotation of the adjusting screw 42 which is necessary for a more effective automatic adjuster.

Referring to the embodiment of FIGURE 6, the same features as is shown in the prior embodiment are designated with like reference numerals with the letter a attached thereto. In this embodiment, a resilient cap 100 is snapped around the open end of the adjusting screw nut 40a and tightly hugs the same. The threaded portion 44a of the adjusting screw 42a is received through an opening 102 in the cap and the edge of the opening 102 tightly grips the threaded portion 44a of the screw 42a. Thus, the cap 100 seals the interior of the adjusting screw nut 40a from outside contaminants and also provides at least a predetermined resistance to rotation of the adjusting screw 42a relative to the adjusting screw nut 40a.

While the invention has been illustrated with regard to a two-piece adjusting screw, it is obvious that the same may be utilized with a standard three-piece adjusting screw, such as shown by the patent to Dombeck, supra.

It is also obvious that if the two-piece adjusting mechanism is utilized, then instead of the adjusting screw rotating, the adjusting screw nut may rotate relative to the adjusting screw while the adjusting screw is fixed to its respective brake shoe end.

Although this invention has been illustrated and described in connection with specific embodiments, numerous other adaptations of the invention will be apparent to those skilled in the art such as extending the above principle to a brake where the adjusting mechanism is not located between adjacent ends of brake shoes as illustrated. I intend to include within the scope of the following claims all equivalent applications of the invention whereby the same or substantially the same results may be obtained.

I claim:

1. In a brake, a pair of brake shoes arranged in end to end relationship, an adjustable strut interposed between a pair of adjacent ends of said brake shoes, said strut comprising: an adjusting screw member having a threaded portion, an internally threaded hollow adjusting screw nut member receiving said threaded portion of said adjusting screw member, means for non-rotatably connecting one of said members to one of said brake shoe ends and means for rotatably connecting the other of said members to the other of said brake shoe ends whereby said members are rotatable relative to each other, a deformable member disposed within said adjusting screw nut and located between the threaded portion of said adjusting screw and the inner surface of said adjusting screw nut, said deformable member being arranged within said adjusting screw nut that the threaded portion of said adjusting screw engages said deformable member to compress the same against the inner surface of said adjusting screw nut.

2. In a brake, a pair of brake shoes arranged in end to end relationship, an adjustable strut interposed between a pair of adjacent ends of said brake shoes, said strut comprising: an adjusting screw member having a threaded portion, an internally threaded hollow adjusting screw nut member receiving said threaded portion of said adjusting screw member, means for non-rotatably connecting one of said members to one of said brake shoe ends and means for rotatably connecting the other of said members to the other of said brake shoe ends whereby said members are rotatable relative to each other, an annular deformable member disposed within said adjusting screw nut and receiving the threaded portion of said adjusting screw therethrough, said deformable member being arranged within said adjusting screw nut that the threaded portion of said adjusting screw member engages said deformable member to compress the same against the inner surface of said adjusting screw nut.

3. The structure as recited in claim 2 wherein said adjusting screw member is the rotatable member.

4. In a brake, a pair of brake shoes arranged in end to end relationship, an adjustable strut interposed between a pair of adjacent ends of said brake shoes, said strut comprising: an adjusting screw member having a threaded portion, a hollow internally threaded adjusting screw nut member, said adjusting screw nut being closed at one end and being open at the other end and receiving said threaded portion of said adjusting screw member through the open end thereof, means for non-rotatably connecting one of said members to one of said brake shoe ends and means for rotatably connecting the other of said members to the other of said brake shoe ends whereby said members are rotatable relative to each other, an internal annular recess at the open end portion of said adjusting screw nut being located between the threaded portion thereof and the open end surface, an annular deformable member disposed within said groove and receiving the threaded portion of said adjusting screw member therethrough, said deformable member being so arranged that the threaded portion of said adjusting screw member engages said deformable member to compress the same against the inner surface of said annular recess.

5. The structure as recited in claim 4 wherein said adjusting screw member is the rotatable member.

6. The structure as recited in claim 2 wherein said adjusting screw nut has at least one longitudinal groove in said threaded portion thereof.

7. The structure as recited in claim 4 wherein said adjusting screw nut has at least one longitudinal groove in said threaded portion thereof.

References Cited in the file of this patent

UNITED STATES PATENTS

| | | |
|---|---|---|
| 1,572,073 | Murphy | Feb. 9, 1926 |
| 2,320,031 | Danforth | May 25, 1943 |
| 2,424,655 | Goepfrich | July 29, 1947 |
| 2,457,908 | Meyerhoefer | Jan. 4, 1949 |
| 2,576,885 | Leighton | Nov. 27, 1951 |
| 3,017,962 | Ingres | Jan. 23, 1962 |